Nov. 1, 1966    G. M. WYLIE    3,282,740
SEALED BATTERY GAS MANIFOLD CONSTRUCTION
Filed April 20, 1964

3,282,740
SEALED BATTERY GAS MANIFOLD CONSTRUCTION

Gayle M. Wylie, Cary, N.C., assignor, by mesne assignments, to the United States of America as represented by the Administrator of the National Aeronautics and Space Administration
Filed Apr. 20, 1964, Ser. No. 360,878
5 Claims. (Cl. 136—170)

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to a novel sealed battery gas manifold construction. In particular, the invention relates to a sealed battery which has a gas manifold interconnecting all of the cells of the battery to provide additional volume within the sealed battery for receiving gases which are evolved during operation of the battery, and the gas manifold is designed in such a manner that the development of an electrolyte path between cells is substantially prevented.

Sealed storage batteries and the problems associated therewith are well known in the electric storage battery industry. One of the principal problems is the evolution of gases during operation of a sealed battery, particularly upon overcharging and overdischarging. Since the battery is sealed, the evolution of an excessive amount of gas can result in an explosion of the battery container.

It is an object of this invention to provide a sealed battery having a gas manifold interconnecting all of the cells of the battery in such a manner that there is a much larger volume to accommodate gases which are evolved during the operation of the battery.

Whereas the gas manifold does provide additional gas space within the battery container to receive evolved gases, it also makes it possible to form an electrolyte path between cells which could short circuit the battery. This problem often occurs in batteries which are inverted during their operation, such as those used on airplanes and missiles. It is particularly prevalent in missile and spacecraft batteries for they are required to operate under conditions in which the force of gravity is zero.

It is another object of this invention to provide a sealed battery having a gas manifold interconnecting all of the cells of the battery which has a tortuous path that must be traveled by any fluid passing from one cell to another.

A further object of the invention is to provide a sealed battery having a gas manifold interconnecting all of the cells of the battery and which has a stand-pipe extending into each cell so as to insure that each cell will have a certain amount of electrolyte-free space, each of said stand-pipes having a tapered end near the electrolyte within each cell.

Figure 2:
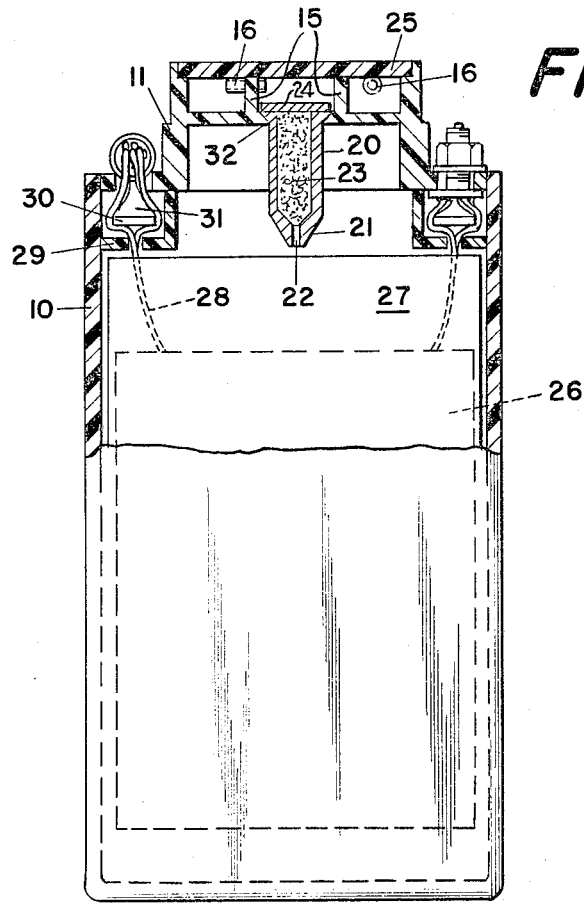
Figure 1:
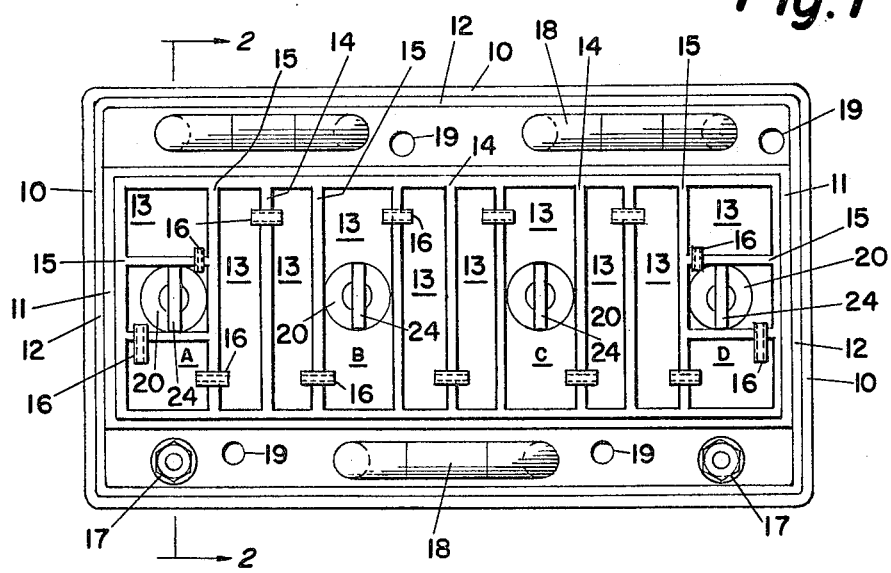

Other objects and advantages of this invention will be apparent to those skilled in the art, particularly in view of the drawings in which:

FIGURE 1 is a top plan view of a 4-cell battery having a tortuous path gas manifold in accordance with this invention; and FIGURE 2 is a section taken on line 2—2 of FIGURE 1.

It has been discovered that a sealed storage battery having a plurality of cells can be provided with a gas manifold interconnecting all of the cells which gives increased protection against the danger of explosion due to accumulated gases. A standard type of alkaline cell has a volume of 75 cc. for gas expansion. It was found that when 14 of these cells were connected and provided with a gas manifold interconnecting all 14 cells, there was a total volume of about 2100 cc. to accommodate gases generated during the operation of the battery.

One of the problems encountered when using such a gas manifold is the possibility that an electrolyte path can develop between the cells and thus cause short circuiting of the battery. In accordance with this invention, this problem has been overcome by providing a tortuous path in the gas manifold whereby a fluid must travel substantially the longest possible path to get from one cell to another. The tortuous path comprises a series of compartments, partitions and tubes which are arranged in a non-aligned manner so as to make it very difficult for electrolyte to form a path between cells.

An additional feature of this invention is that each cell has access to the space enclosed by the manifold through a stand-pipe which projects into each cell. The stand-pipe extending into each cell insures that the electrolyte-free volume at the top of each cell will be available to accommodate gases generated during the charging and discharging of the battery, regardless of where the free electrolyte moves. The stand-pipe comprises a hollow tube which is tapered at the end near the electrolyte, with a small bore hole in the tapered end giving access to the space enclosed by the manifold. For additional protection against electrolyte creepage, the stand-pipe may be filled with a porous, absorbent material such as a cellulosic sponge.

A more detailed description of a preferred embodiment of this invention may be obtained by referring to the drawings, in which FIGURE 1 is a top plan view of a 4-cell sealed battery having a tortuous path gas manifold. As shown in FIGURE 1, a battery container 10 is fitted at its top with a gas manifold top piece, generally designated as 11. The gas manifold, which may be a molded, electrolyte-resistant, plastic piece, has a beveled edge 12 and comprises a series of compartments 13, partitions 14 and 15 and tubes 16. The edge 12 is beveled in order to accommodate a cement fillet. The partitions 14 also extend below the gas manifold and function as intercell partitions in cooperation with the intercell partitions in the container with which they are aligned. One of the principal features of this invention is that the tubes 16 which interconnect the compartments 13 through the partitions 14 and 15 are arranged in a non-aligned manner so as to form a tortuous path interconnecting the cells A, B C and D. This requires every fluid to travel the tortuous path in order to pass from one cell to another, which renders the formation of electrolyte paths between cells extremely difficult.

Other conventional items which are illustrated in FIGURE 1, are the cell terminals 17 and the intercell electrical connectors 18. The holes 19 which communicate with the housing 29 are used to fill the housing 29 with an electrolyte-resistant, sealing composition such as an epoxy resin sealant. This prevents electrolyte from leaking around the electrode lug wires 28.

Another feature of this invention is the stand-pipes 20 which are inserted into the gas manifold and cemented into place. A stand-pipe is clearly illustrated in FIGURE 2. There is a stand-pipe projecting into each cell of the battery. The stand-pipe is a hollow tube which has a tapered end 21 near the electrolyte with a small bore hole 22, e.g. 0.015 inch in diameter, to permit gases which are evolved to escape into the gas manifold. The stand-pipe may be filled with a porous, absorbent material 23 to further impede electrolyte creepage. A plastic strip 24 is cemented onto the top of the stand-pipe to hold the absorbent material in place. It is known that in the absence of the force of gravity, the tendency of a wetting liquid is to move toward the apex of a cone. Therefore, batteries which are to be used on missiles should be equipped with stand-pipes having tapered ends, for any electrolyte passing through the opening 22 would be stopped by surface tension forces from moving away from the apex of the opening in the stand-pipe. In addition it should be noted that the stand-pipe extends a substantial distance into the cell and thereby maintains an electrolyte-free space to accommodate gases generated when the battery is charged and discharged.

FIGURE 2 also illustrates several other features of the sealed battery. The gas manifold has a top piece 25 which is cemented into place after the stand-pipes are inserted and cemented to the gas manifold. Prior to cementing the gas manifold into the top of the battery container, the electrodes 26 and the separators 27 are placed into the container. The electrode lug wires 28 are inserted into the housing 29, spread about a plastic strip support 30, and then the gas manifold piece may be brought into place with the wires projecting through holes provided in the gas manifold. Then a cementitious sealing composition 31 may be poured into the housing through holes 19 to seal the electrode wires. Prior to cementing the gas manifold into place and after wires 28 are sealed, the electrolyte may be added to each cell through the holes 32 into which the stand-pipes are later cemented.

In addition to the above-mentioned advantages of this invention, the tortuous path gas manifold construction provides a means for gases which might be evolved in a weak cell to travel to a stronger cell and be recombined with the electrodes in the stronger cell. In other words, this invention provides both a larger gas expansion volume and also a means for consuming gases produced in one or more weak cells. Still another advantage is that the intercell walls can be made thinner and lighter since no differential pressure can develop between cells.

The tortuous path gas manifold construction of this invention is applicable to all types of sealed cells, including cells using either acid or alkaline electrolyte. The invention is particularly applicable to alkaline cells having silver-zinc, silver-cadmium or nickel-cadmium electrodes.

Having completely described this invention, what is claimed is:

1. In a sealed electric storage battery having a plurality of cells containing a liquid electrolyte, the improvement which comprises a tortuous path gas manifold top piece displaced from and interconnecting all of the cells of the battery, said gas manifold top piece comprising a series of compartments defining a volume which is substantially free of electrolyte, partitions and tubes, the tubes which interconnect the compartments through the partitions being arranged in a non-aligned manner so as to form a tortuous path interconnecting the cells.

2. An article in accordance with claim 1 in which each cell has access to the gas manifold by means of stand-pipes which are firmly attached to the gas manifold piece and project into each cell of the battery.

3. An article in accordance with claim 2 in which each stand-pipe comprises a hollow tube having a tapered end near the electrolyte in each cell with a small bore hole in the apex of said tapered end through which gases evolved in each cell can escape into the gas manifold.

4. An article in accordance with claim 3 in which each stand-pipe is filled with a porous, absorbent material.

5. In an electric storage battery of the type having a plurality of adjacent cells provided with a liquid electrolyte, the improvement comprising in combination: a gas manifold comprising a partitioned fluid conduit having a plurality of partitions, means mounting said conduit adjacent the cells of the storage battery, means defining a plurality of fluid-conducting orifices arranged in spaced alignment along the conduit and extending from the conduit to the cells in a manner such that a flow of fluid may be established between the cells along a tortuous path extending between the orifice through the partitions of the partitioned conduit, and means disposed along the tortuous path adapted to impede passage of the liquid electrolyte therealong, whereby those gases generated in the cells during the operation of the battery may be readily exchanged between the cells while electrolyte flow is significantly impeded.

References Cited by the Examiner
UNITED STATES PATENTS
2,662,108  12/1953  Coates _____ 136—177.21 X WINSTON A. DOUGLAS, *Primary Examiner.*
D. L. WALTON, *Assistant Examiner.*